United States Patent [19]

Overath

[11] Patent Number: 4,834,872
[45] Date of Patent: May 30, 1989

[54] AERATION/FLOTATION REACTOR

[75] Inventor: Horst Overath, Juelich, Fed. Rep. of Germany

[73] Assignee: KFA Juelich, Juelich, Fed. Rep. of Germany

[21] Appl. No.: 134,230

[22] Filed: Dec. 17, 1987

[30] Foreign Application Priority Data

Dec. 22, 1986 [DE] Fed. Rep. of Germany ....... 3643931

[51] Int. Cl.$^4$ ............................ C02F 3/08; C02F 1/24
[52] U.S. Cl. .................................... 210/151; 210/188; 210/221.2
[58] Field of Search ............... 210/150, 151, 169, 220, 210/221.2, 221.1, 616, 617, 256, 218, 188

[56] References Cited

U.S. PATENT DOCUMENTS 4,507,253  3/1985  Wiesmann ........................ 210/221.2
4,749,493  6/1988  Hicks .................... 210/169

FOREIGN PATENT DOCUMENTS 0125162  11/1984  European Pat. Off. ............ 210/150

Primary Examiner—Benoit Castel
Attorney, Agent, or Firm—Foley & Lardner Schwartz, Jeffery Schwaab, Mack Blumenthal & Evans

[57] ABSTRACT

An aeration/flotation reactor, of particular usefulness in the treatment of biomass-containing liquids, comprises a foam tube which terminates at the top in a collecting vessel and overlaps, or is inverted over, an inner rising tube which is preferably coaxial. The latter tube delimits an inlet chamber positioned, at the bottom of the foam tube, to receive liquid and finely divided gas bubbles. The lower end of the foam tube is enlarged, preferably into a funnel-shape, and runs into the lower region of an outer tube, the upper end of which is connected, via a return tube, to the inlet chamber below the axial rising tube. The outer tube, which is open at the top, is provided with a T-shaped liquid outlet having a dip connector, which extends below the liquid level, and with an outlet level immediately above the junction of the return tube. The upper end of the foam tube can be extended telescopically, thus permitting adaptation of the device to liquid/gas systems characterized by different foam properties.

9 Claims, 2 Drawing Sheets

AERATION/FLOTATION REACTOR

BACKGROUND OF THE INVENTION

The present invention relates to an aeration/flotation reactor which is particularly useful in the treatment of biomass-containing liquids. In general terms, the reactor has a foam tube equipped, at its top, with a collecting vessel and at its bottom with an inlet chamber for the entry of liquid and gas in the form of fine bubbles.

Aeration and flotation of biomass-containing liquids can play an important role in various areas of biotechnology. A specific example of such a role relates to the treatment of waste water from seawater aquaria. Protein-containing material is constantly added, as feed, to the water of such aquaria, and can collect. Over a relatively prolonged period, this material is then degraded by microorganisms, leading to the accumulation of nitrate, which is especially harmful to sensitive sea animals.

One way of keeping the nitrate content low is via the denitrifying treatment of the water in a rotating fixed-bed reactor, as described in the present inventor's German patent application No. P 3,608,466, filed Mar. 14, 1986. But water denitrified in such a reactor cannot be fed back into an aquarium without an aftertreatment because it (i) contains no life-supporting oxygen; (ii) is permeated with water-turbidifying biomass; (iii) has a redox potential of $-220$ mV, compared to a desired value in the range of between $+200$ and $+230$ mV; and (iv) possibly contains nitrite, which is extremely toxic even at low concentrations ($\geq 1$ mg/l).

SUMMARY OF THE INVENTION

It is therefore an object of the present invention to provide an aeration/flotation reactor that can effect an aftertreatment of liquid circulated therethrough, such that the treated liquid is charged with oxygen and is purified of biomass and nitrite, for example, to the extent that it can be fed back into an aquarium.

In accomplishing the foregoing object, there has been provided, in accordance with one aspect of the present invention, an aeration/flotation reactor comprising (i) a foam tube; (ii) a collecting vessel positioned at a first end of the foam tube; (iii) an inlet chamber positioned at the other end of the foam tube; (iv) a first tube positioned within the foam tube such that liquid can pass through the first tube from the inlet chamber to the foam tube, the first tube having an end that is enlarged; and (v) a second tube, within which the foam tube is positioned, that sealingly engages the enlarged end of the first tube to define a border of the inlet chamber, wherein the second tube is in communication with the inlet chamber via at least one conduit which is connected, respectively, to the second tube and the inlet chamber, and wherein the first end of the foam tube is telescopically extendable.

In one preferred embodiment, an outlet member provided within the second tube is in communication with the environment outside the second tube and comprises a first tube element oriented toward the inlet chamber and a second tube element oriented toward the collecting vessel, which second tube element terminates above the point of connection between the second tube and the conduit by which the second tube communicates with the inlet chamber. In another preferred embodiment, the collecting vessel is provided with a sieve cap that contains activated charcoal.

Other objects, features and advantages of the present invention will become apparent from the following detailed description. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention is described below with reference to illustrative embodiments and to the appended drawings, where.

DETAILED DESCRIPTION OF PREFERRED EMBODIMENTS

Although a foam tube having a settling vessel and an inlet chamber at the bottom is disclosed by Overath, Zeitschrift des Kölner Zoo 22: 69–72 (1979), the mode of action of this arrangement is not effective enough to overcome the above-mentioned problems on oxygen nonavailability, biomass contamination, etc.

Figure 1:
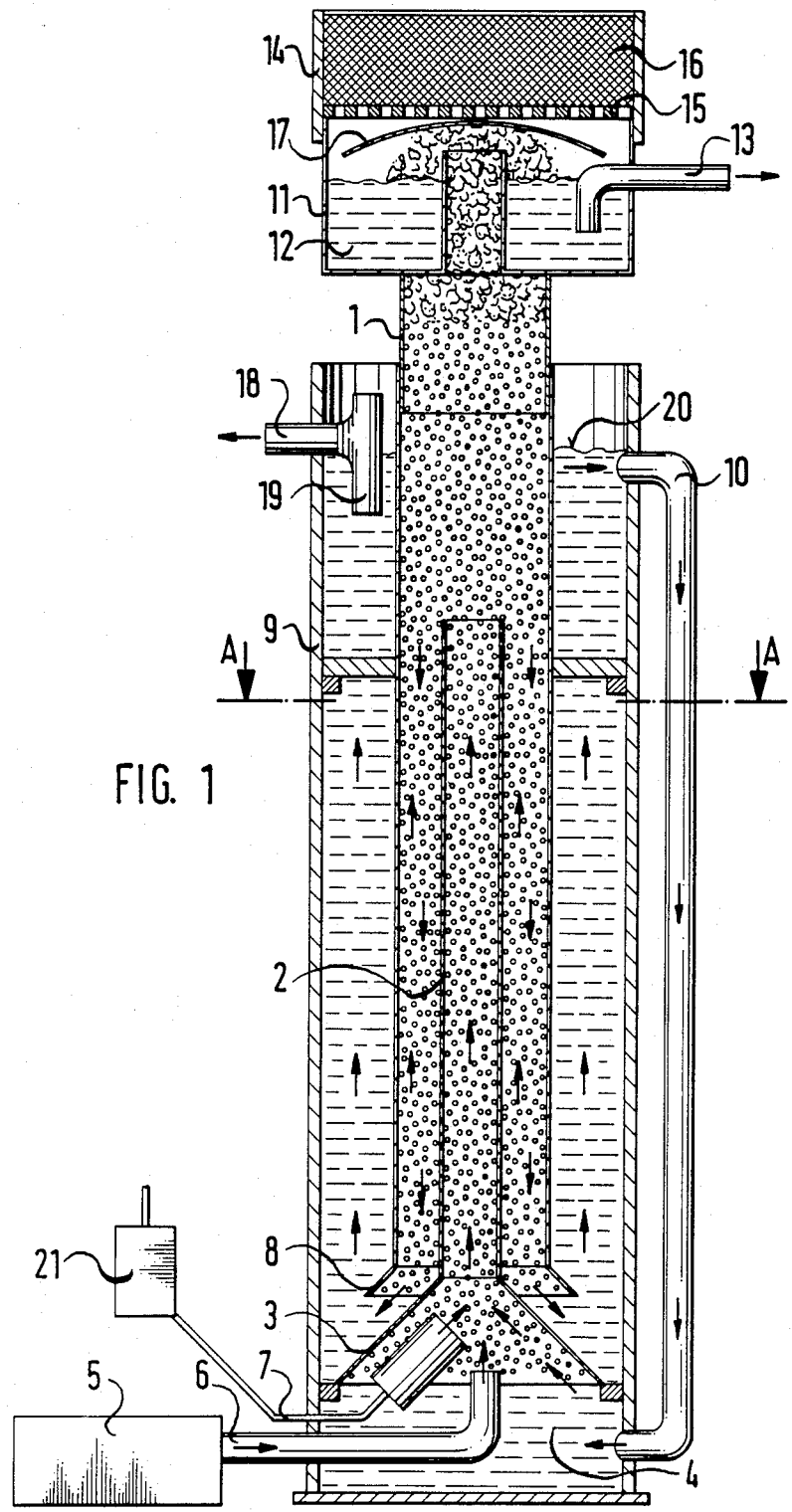
FIG. 1 is a line drawing that provides a schematic, longitudinal-sectional perspective of a reactor device within the present invention.

FIG. 1 shows a foam tube (1) having an internal rising tube (2), the preferably funnel-shaped extension (3) of which delimits an inlet chamber (4) into which liquid, arriving from a denitrification stage indicated schematically as component 5, is passed via a supply line (6). By means of one or more gas distributors (7), which are preferably formed by a porous, basswood gas-input, an air/ozone mixture from an ozonizer (indicated schematically by 21) is passed, in the form of very fine bubbles, into the liquid inside funnel 3.

The design of the ozonizer is not critical to the present invention. A exemplary ozonizer suitable for the present invention is an apparatus supplied by Messrs. Sander, Elze (FRG) for use in aqueous environments. The proportion of $O_3$ introduced into the liquid inside end portion 3 of rising tube 2 is controlled so that protein present in the liquid is not denatured.

Gas and liquid rise upwardly, in accordance with the airlift principle, in a rising tube (2), and pass into the foam tube 4. This results in the building up of a foam column in an upward direction while, in the section surrounding rising tube 2, a downward stream develops at the same time. The gas bubbles migrate downwardly with this stream to an "undertow current relief cone," which in FIG. 1 is the funnel-shaped end (8) of foam tube 4.

The downward stream is slowed until bubble reversal takes place. The upward-flowing gas meets the bubbles moving downwardly, which causes heavy turbulence and, thereby, an increase in the residence time of the gas in the liquid; this favors dissolution of the gas in the liquid. In other words, a turbulent movement of bubbles takes place in both directions (upward and downward) between the rising tube and the foam tube.

Figure 2:
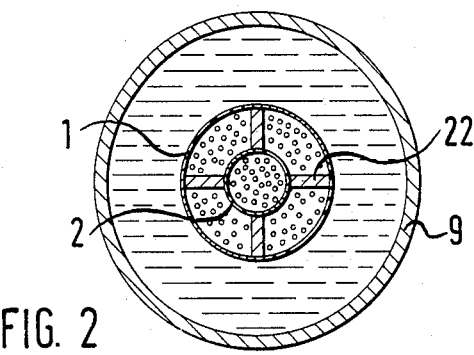
FIGS. 2 and 3 are each schematic drawings that depict, in cross section along line A—A in FIG. 1, a reactor of the present invention provided with baffles.
Figure 3:
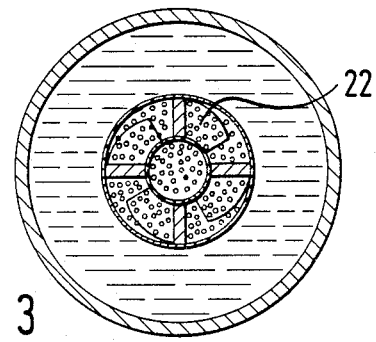

Between the rising tube and the foam tube, longitudinal ribs can be provided as baffles (22), thereby to lengthen the stream path, as indicated by FIGS. 2 and 3. The baffles 22 are optionally spiral.

The bubble-free liquid leaving the bottom end of the foam tube flows upward in an outer tube (9), which is preferably oriented concentrically around the foam tube. The liquid in outer tube 8 passes, via at least one return conduit (10), back into inlet chamber 4. This recycling provides for the most effective possible saturation of the liquid with oxygen, which means that the redox potential can be increased from −220 to between about +200 and +230 mV, as desired. The recycling would typically occur some 60 to 100 times per hour, depending on the supply of air and the amount of liquid to be processed. Nitrite contained in the liquid supplied to the system is then oxidized to nitrate. At the same time, the recycling further enhances the biomass removal by the flotation. By contrast, the effluent produced when known aeration apparatuses are used generally contains some of the protein-containing substances initially present in the treated liquid.

Packing elements can be provided, pursuant to the present invention, in the space between outer tube 9 and foam tube 1, in order to provide a filtering and adsorptive action. Alternatively, carrier elements can be similarly positioned and populated with microorganisms (e.g., aerobic bacteria), which can develop an additional purifying action.

The upper end of foam tube 1 is preferably structured so that its length can be extended telescopically. In this way, foam tube 1 can readily be fitted to a collecting vessel (see item 11 in FIG. 1) in which biomass (12) accumulates; the latter can be discharged via an outlet conduit, which is shown as a downward-bent tube (13) in FIG. 1. It is preferable that such a collecting vessel be provided with a removable sieve cap (14) having a sieve (15) at the bottom and an activated charcoal layer (16). Ozone-containing air can then be released through the sieve, thereby catalytically destroying the ozone.

In a preferred embodiment of the present invention, a curved plate (17) is provided below sieve 15 to prevent the passage of biomass into the sieve.

Aerated liquid from which biomass has been removed leaves outer tube 9 through a liquid outlet (18), the lower dip connector (19) of which extends below the liquid surface, thus preventing gas and floating biomass being dragged along.

Depending on the rate of air supply, an air/liquid column builds up within foam tube 1 above the liquid level (20). More specifically, the height of this column depends on the air supply rate,
the cross-section and length of inner rising tube 2,
the cross-section and length of foam tube 1,
the surface tension of the liquid to be treated,
the biomass content of that liquid,
the ozone supply rate, and
the air bubble cross-section.

Liquid is constantly added during normal operation of apparatus within the present invention, and cannot leave foam tube 1 in an upward direction. Accordingly, a pressure is produced at the upper edge of inner rising tube 2 which is sufficient to push a substream of the supplied liquid downward through foam tube 1. The amount of pressure developed in this regard is dependent on the amount of liquid supplied and the air/liquid column arising in the foam tube. At the same time, the air/ozone bubbles present in the liquid are sucked, along with the downward-flowing liquid, to the lower, preferably funnel-shaped end (8) of the foam tube, and then rise again.

During aeration, biomass in the treated liquid accumulates on the air/ozone bubbles and rises in the air/liquid column. As a function of the above-mentioned parameters, a more or less solid biomass foam (flotation) forms in the uppermost part of the air/liquid column. This foam is forced by the escaping air into collecting vessel 11. In the latter, the biomass liquefies and is discharged via outlet 13, which projects, along with its receiving aperture, into the floated biomass and prevents the escape of ozone-containing air from outlet 13. Such air is forced to pass over the activated charcoal layer (16) on collecting vessel 11, and the ozone, is destroyed here.

The arrangement described above for apparatus of the present invention is distinguished by a high effectiveness with respect to saturation of the treated liquid with gas (oxygen), and by good separation of biomass at low operational costs and reduced apparatus size. In the following illustrative example, the present invention is employed in the aeration of seawater in a laboratory aquarium, but it can also be applied to the removal of protein-containing substances during aerobic treatment of water and for clarification of effluent generated by the fish or meat-processing industry.

EXAMPLE

A laboratory device was produced, in accordance with the foregoing description, to have an outer tube of 1010 mm in length and 150 mm in diameter; an inner rising tube of 40 mm diameter with a length of 820 mm (910 mm with funnel); a foam tube 1 of internal diameter 70 mm and a length (to the lower edge of the collecting vessel) of 1065 mm; and a collecting vessel 11, equipped with removable sieve cap 14, of about 120 mm in height and 100 mm in diameter. The return tube 10 and the liquid outlet 18 had an internal diameter of 32 mm.

This device of the present invention accommodated 20 l/h of liquid passed in through a supply line (6). The device was used for aftertreatment of denitrated water from a seawater aquarium. Of course, much larger versions (for example, for 1,000 l/h throughput) or smaller variants can be produced, if required, in accordance with the present invention.

What is claimed is:

1. An aeration/flotation reactor comprising
   (i) a foam tube,
   (ii) a collecting vessel positioned at a first end of said foam tube, said collecting vessel having an outlet conduit,
   (iii) an inlet chamber positioned at the other end of said foam tube,
   (iv) a first tube positioned within said foam tube such that liquid can pass through said first tube from said inlet chamber to said foam tube, said first tube having an end that is enlarged,
   (v) means for introducing gas into the enlarged end of said first tube,
   (vi) a second tube, within which said foam tube is positioned, that sealingly engages said enlarged end of said first tube to define a border of said inlet chamber, and
   (vii) an outlet member provided within said second tube, said outlet member being in communication with the environment outside said second tube,
   wherein said second tube is in communication with said inlet chamber via at least one conduit which is connected, respectively, to said second tube and said inlet chamber, and wherein said first end of said foam tube is telescopically extendable.

2. A reactor as claimed in claim 1, wherein said outlet member comprises a first tube element oriented toward said inlet chamber and a second tube element oriented toward said collecting vessel, wherein said second tube element terminates above the point of connection between said conduit and said second tube.

3. A reactor as claimed in claim 1, wherein said foam tube, said first tube and said second tube are arranged concentrically.

4. A reactor as claimed in claim 1, wherein said collecting vessel is provided with a sieve cap containing activated charcoal.

5. A reactor as claimed in claim 4, wherein said sieve cap comprises a sieve plate which is connected to a curved plate positioned within said collecting vessel.

6. A reactor as claimed in claim 1, further comprising at least one packing element positioned between said foam tube and said outer tube.

7. A reactor as claimed in claim 6, wherein said packing element is populated by microorganisms.

8. A reactor as claimed in claim 1, wherein said means for introducing gas is fluidly connected to a source of ozone.

9. A reactor as claimed in claim 1, further comprising baffles provided between said first tube and said foam tube.

* * * * *